UNITED STATES PATENT OFFICE.

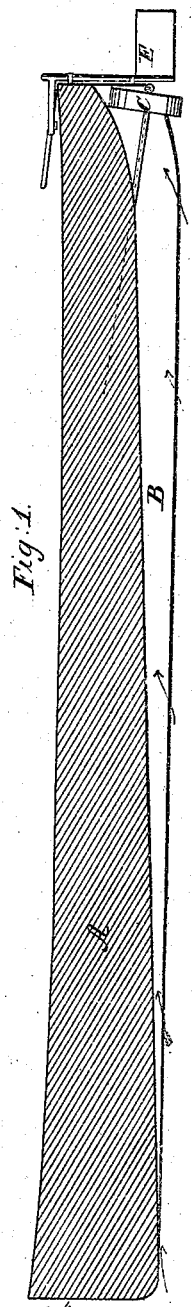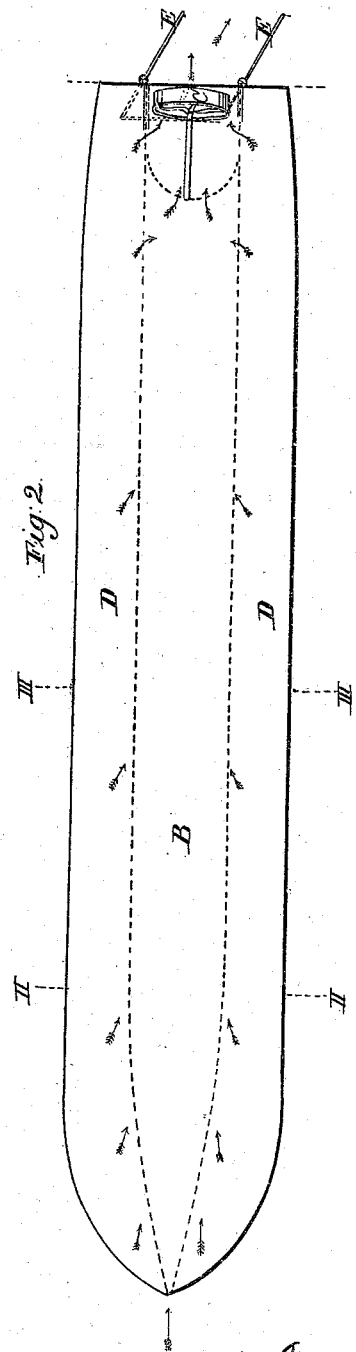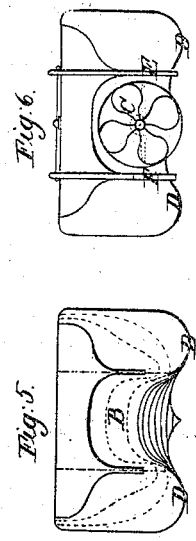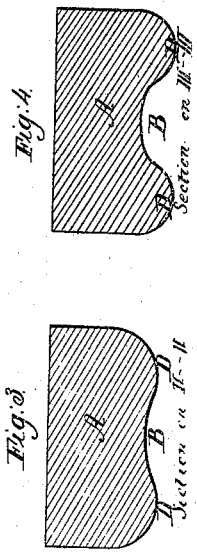

JAMES MONTGOMERY, OF NEW YORK, N. Y.

IMPROVEMENT IN THE CONSTRUCTION OF STEAM-VESSELS.

Specification forming part of Letters Patent No. 23,105, dated March 1, 1859.

*To all whom it may concern:*

Be it known that I, JAMES MONTGOMERY, of the city, county, and State of New York, have invented new and useful Improvements in Steam and other Vessels; and I hereby declare the following to be a full and exact description of the same, reference being had to the accompanying drawings, making part of this specification.

The said invention consists, first, in a peculiar method of constructing the hulls of vessels, so as to increase their strength and to facilitate their passage through the water by providing for the more rapid replacement of water displaced at the bow, and, second, in methods of arranging screw-propellers and rudders in connection with hulls so constructed.

In the accompanying drawings, Figure 1 is a longitudinal section. Fig. 2 is a bottom view. Figs. 3 and 4 are transverse sections. Fig. 5 is an elevation of the stern with the propeller omitted. Fig. 6 is a similar view with the propeller in position.

A represents the hull of a vessel constructed with a cavity B, commencing near the stem and rising, as shown, at a regular angle to near the stern, where it turns more abruptly upward and forms a space to accommodate a screw-propeller C. The cavity B may present in all parts of its transverse section (excepting at the extreme bow) an arc of uniform chord and decreasing radius, so as to increase in vertical depth, as before stated, until it acquires near the stern a semicircular form. The cavity B is bounded on each side by an inverted arch D, forming in connection a corrugated bottom of great strength.

E E are two rudders, (one on each side of the cavity B,) which being turned simultaneously by any suitable means deflect in either direction the mass of water flowing through the cavity B.

The propeller C may consist of two or more helical blades surrounded by a metallic cylinder riveted to and revolving therewith. It is placed in a plane somewhat oblique from the perpendicular, as exhibited, to obviate the disposition to settle by the stern, to which canal-boats in particular are subject in consequence of the small body of water through which they pass.

In screw steam-vessels of all classes it is of great importance to maintain a constant and full supply of water to the propeller and that the volume of water on which the propeller acts shall be as free as possible from injurious disturbance by the passage of the vessel. For this reason it is common to construct such vessels with a long clean "run," which assists the effective action of the screw, but is injurious in reducing at once the flotation and the carrying-room of the after part of the vessel.

The effect produced by the cavity B when the vessel is propelled through the water is to rapidly carry toward the stern a large part of the water displaced at the bow and deliver it in an unbroken volume to the action of the screw, the increasing depth of the said cavity tending further to collect much of the water displaced laterally and draw it beneath the bottom of the vessel, which is also facilitated by the curved form of the outer edge. (See arrows.) It is evident that a more rapid motion by displacing a larger volume of water in a given time necessitates a corresponding increase in the rapidity of replacement. The angle at which the cavity B increases in capacity sternward will therefore be graduated according to the speed at which the vessel is intended to be propelled.

In cases of vessels designed for use in very shallow waters more cavities than one will often be used, a screw-propeller being placed at the after part of each. A single cavity extending nearly the entire width of the vessel would be less advantageous in its operation, as it would fail at once to concentrate water toward the screw and to remove the resistance caused by vessels settling by the stern in small bodies of water.

The following are among the advantages in my improved construction of hull.

First. The form is such as to meet the least possible resistance in passing through the water, much of the lateral displacement being avoided and the vessel tending instead to override the water. Time is thus gained in the displacement and replacement of the water and the vessel can be constructed with vertical sides and great breadth of beam, giving her stanchness to carry sail and reducing her draft so as to open new waters and ports to the navigation of ships of large size.

Second. The cavity also adds much to the strength of the vessel, especially near the stern, where the machinery is located, and the verticality of the sides, as well as giving greater strength reduces the cost of building, while the bottom itself is not more costly than as at present constructed.

Third. The cavity protects the propeller from injury by snags, river-banks, sunken rocks, concussion of the sea, and floating bodies, and admits of the more effective action of a screw whose axis is inclined as represented.

Fourth. In its application to steam and other canal boats it prevents the swell of lateral displacement, which tends to wash the material of the banks into the center of the canal, and causes instead a current at the bottom which acts to deepen shallow places and deposit earthy matters in the deeper parts. It also obviates the enormous loss of power experienced from the common canal-boat settling at the stern, and thus presenting its broad flat bottom at an angle from the horizontal, so as to produce a wave in front and prevent the water passing back freely beneath the stern. The cavity is adapted to carry the displacement water aft with sufficient rapidity to maintain an equal degree of immersion at stem and stern in laden boats. An unloaded boat will be much higher out of the water forward, while the weight of machinery at the stern maintains there a sufficient degree of immersion to render the propeller effective. At such a time the boat may be driven at a higher speed, the peculiar form of bottom effectually preventing all injury to the banks and at the same time obviating the disadvantageous effect above referred to which occurs with a boat of common construction when more deeply immersed at the stern than forward. The difficulty is thus surmounted which has been chiefly instrumental in preventing the introduction of steam-power on canals. The wave produced by boats as commonly constructed when more deeply immersed at the stern than forward is such as to prohibit their propulsion at a paying speed, and without such greater immersion at the stern when the boat is empty the propeller ceases to be effective.

Fifth. The cavity also assists the steering qualities of the vessel when combined with duplex rudders, as set forth, to deflect the body of water to either side.

I claim as new and of my invention and desire to secure by Letters Patent—

1. Constructing the hulls of vessels with one or more cavities in the bottom, commencing at or near the stern and increasing in capacity sternward, substantially as and for the purposes set forth.

2. Constructing the bottoms of vessels with corrugations extending from stem to stern, as set forth, which give strength to the hull and a portion of which form the cavity or cavities above referred to.

3. The described combination of an inclined screw-propeller with a hull constructed as set forth.

4. Two or more rudders operating as set forth, in combination with the described longitudinal cavities in a ship's bottom.

In testimony of which invention I hereunto set my hand.

JAMES MONTGOMERY.

Witnesses:
 OCTS. KNIGHT,
 EDM. F. BROWN.